United States Patent
Holly, III et al.

[11] Patent Number: 5,270,598
[45] Date of Patent: Dec. 14, 1993

[54] SOLID CONNECTOR FOR STATOR PHASE WINDING AND METHOD OF ASSEMBLY

[75] Inventors: Henry M. Holly, III, Winter Park, Fla.; Russell D. Fetzko, West Mifflin; Hans W. Lange, Monroeville, both of Pa.

[73] Assignee: Westinghouse Electric Corp., Pittsburgh, Pa.

[21] Appl. No.: 870,050

[22] Filed: Apr. 15, 1992

[51] Int. Cl.$^5$ .............................................. H02K 11/00
[52] U.S. Cl. ...................................... 310/71; 310/42; 310/208; 310/260; 310/270
[58] Field of Search ................. 310/260, 270, 213, 71, 310/208, 91, 184, 42, 198; 336/186

[56] References Cited

U.S. PATENT DOCUMENTS

| | | | |
|---|---|---|---|
| Re. 27,489 | 9/1972 | Brenner | 310/213 |
| 1,144,252 | 6/1915 | Roebel . | |
| 2,370,348 | 2/1945 | Greene | 310/260 |
| 3,118,015 | 1/1964 | Willyoung | 174/33 |
| 3,188,377 | 6/1965 | Hughes | 174/33 |
| 3,192,423 | 6/1965 | Pearson | 310/71 |
| 3,280,244 | 10/1986 | Pannen | 174/34 |
| 3,647,932 | 3/1972 | Heller et al. | 174/34 |
| 4,117,358 | 9/1978 | Flick | 310/260 |
| 4,199,700 | 4/1980 | Daugherty | 310/71 |
| 4,806,807 | 2/1989 | Levino | 310/71 |
| 4,894,575 | 1/1990 | Nilsson | 310/260 |
| 5,051,642 | 9/1991 | Hediger | 310/260 |
| 5,055,729 | 10/1991 | Fogarty | 310/260 |
| 5,063,315 | 11/1991 | Rasmussen | 310/71 |
| 5,063,320 | 11/1991 | Watanabe | 310/42 |

Primary Examiner—R. Skudy

[57] ABSTRACT

A solid series connector for electrically connecting a first half-coil to a second half-coil in a stator phase winding includes first and second solid conductor members which are fixedly electrically connected at both ends to groups of conductive strands in the respective half-coils. The connector is much less labor-intensive to install than the group transposition connections used in the past, is more rugged and durable under high temperatures and stresses, and is relatively compact. A second embodiment of the invention is a solid phase connector that incorporates many of the novel features in the solid series connector. A novel method of preparing a conductive strand group for connection to such connectors is also claimed.

11 Claims, 3 Drawing Sheets

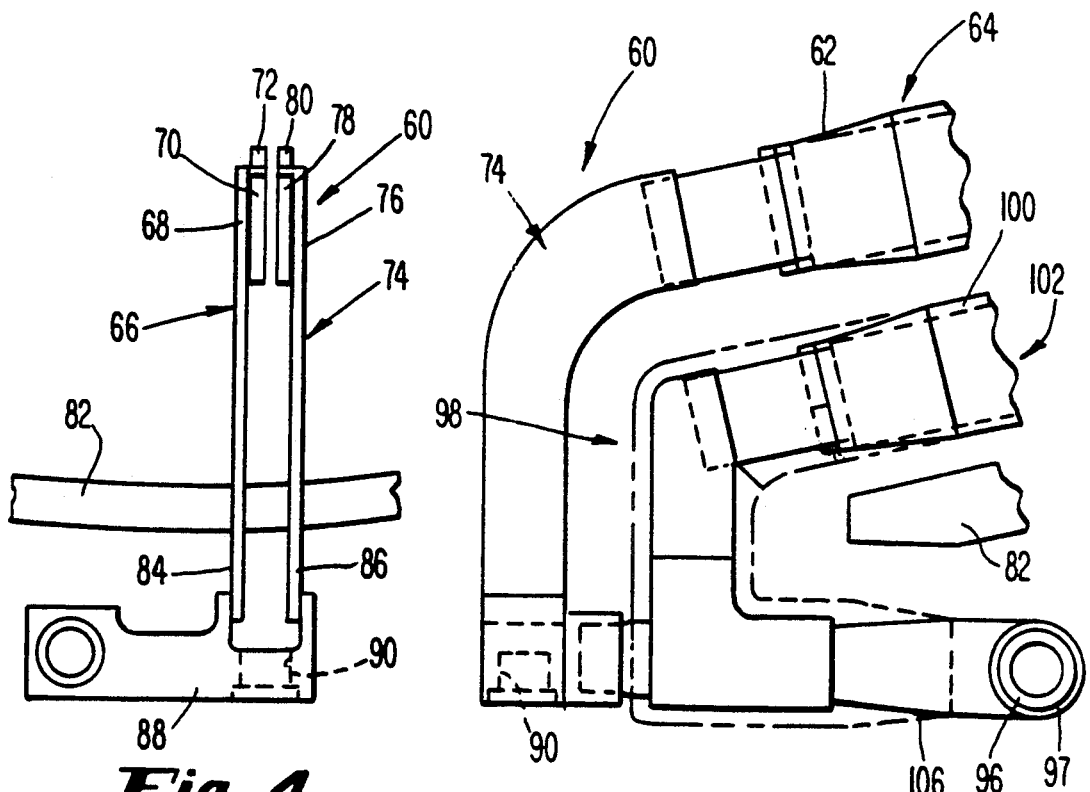
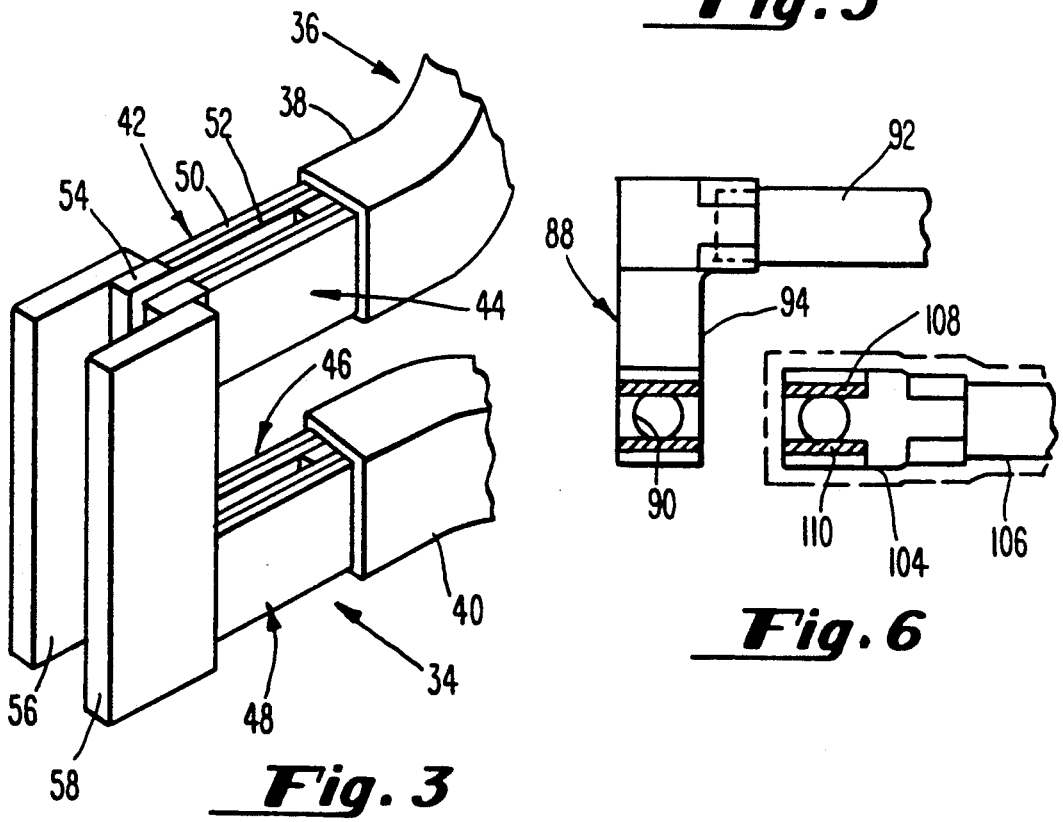

SOLID CONNECTOR FOR STATOR PHASE WINDING AND METHOD OF ASSEMBLY

FIELD OF THE INVENTION

This invention relates to phase windings of the type which are provided in electrodynamic systems such as a multiphase electrical generator. More specifically, this invention relates to improved connectors for use within such phase winding coils, and a novel method for fabricating such connectors.

BACKGROUND OF THE INVENTION

Multiphase electrical generators of the type which are manufactured by Westinghouse Electric Company, the assignee of this invention, commonly incorporate a plurality of stator windings, which are the high voltage AC winding armature elements that provide the generator's output voltage and current. Stator windings are formed of conductive coils, in which ac voltage is induced by the passage of the rotors magnetic flux field. Each coil commonly includes a plurality of half-coils, each half-coil extending the length of the slot in the stator and being joined to another half-coil or a phase end lead at the end turn or involute portion of the stator assembly. The end of such a half-coil 10 according to one prior art design is illustrated in FIG. 1. As may be seen in FIG. 1, half-coil 10 includes stacks 14, 16, 20, 22 of copper conductor strands and a stack 24 of vent tubes through which a coolant such as hydrogen gas is intended to circulate. The individual strands in adjacent strand stacks 14, 16 and 20, 22, respectively, are transposed to form a pair of braid like roebel bars 12, 18, respectively, to reduces losses from cross slot flux and to reduce hot spot temperatures. This process, known as roebelling, maintains relatively uniform voltage differences among strands.

In the coil ends or involutes, the effect of voltage induced by end region flux is conventionally controlled by a group transposed series connection, which is depicted in FIG. 2. Such a connection joins the strands from the first half-coil to corresponding strands in a second half-coil 26 by separating the strands into individual strand groups 28, 30, respectively, and then joining each strand group 28 with a corresponding strand group 30 in an individual series connection 32. This process is labor-intensive, time consuming and cumbersome. First, the individual strands must be separated and their strands regrouped into specified bundles. The strands must also be cleaned, tinned, bundled into clips, and soldered into the series connector 32. The purpose of tinning is to provide a uniform solder coating that will prevent voids when the strands are bundled into crimped or bolted connectors and heat fused together. The exposed strand ends are first cleaned with an abrasive wheel or by hand, and then wiped with alcohol to remove dust and other contaminates. Next, the strands are brushed with a rosinalcohol flux to prepare the copper surface for tinning. Then the copper strand ends are hand dipped into heated solder. Excess solder is allowed to drip off, and is smoothed by wiping. An alternative method, which is more reliable but far more laborious, is to apply the solder coating by hand, to each strand individually, using a soldering iron with a thermocouple attached to control soldering temperature.

Using either method, considerable skill and care are required to achieve uniform tinning. Deviations from precise temperature/time process requirements produces weak and uneven adhesion between the copper and the solder. Lumps and irregular thicknesses of solder may also be produced. When these strands are fitted into a bolted series or phase connector, their uneven coating prevents effective tightening. Cold solders may cause voids to develop between strands, which can cause the unit to fail ultrasonic inspection. In that case, the entire process must be done over. The cost of rework and delays can be considerable. Moreover, working space for tinning and connecting is cramped. These and numerous other problems occur with the present, conventional, group transposed connectors.

It is clear that there has existed a long and unfilled need in the prior art for an improved connector for connecting the strands of a phase winding half-coil in an electrodynamic system such an a multiphase electrical generator to a like half-coil, or to a phase end lead.

SUMMARY OF THE INVENTION

Accordingly, it is an object of the invention to provide an improved connector for electrically connecting a half-coil in a stator phase winding and an electrodynamic system such as a multiphase electrical generator to a like half-coil, or to a phase end lead.

It is further an object of the invention to provide an improved connection for use in a stator phase winding which is less laborious to install than the group transposed connectors heretofore known.

It is further an object of the invention to provide a connector for use in a stator phase winding, which is anticipated to require substantially less inspection and maintenance than the group transposed connectors heretofore known.

In order to achieve the above and other objects of the invention, a solid series connector according to a first aspect of the invention for electrically connecting a first half-coil in a stator phase winding to a second half-coil so that a first group of strands in the first half-coil are connected to a third group of strands in the second half-coil and so that a second group of strands in the first half-coil are connected to a fourth group of strands in the second half-coil includes a first conductor member which is affixed at a first end to the first group of strands in the first half-coil and is affixed at a second, opposite end to the third group of strands of the second half-coil; and a second conductor member which is affixed at a first end to the second group of strands in the first half-coil and is affixed at a second, opposite end to the fourth group of strands in the second half-coil, whereby a solid connection between the half-coils is achieved which is less labor-intensive to install and is more durable than connection heretofore known.

According to a second aspect of the invention, a solid phase connector for electrically connecting a phase winding coil in an electrodynamic system such as a multiphase electrical generator to a conductive ring member in such a system, includes a first conductor member which is affixed to the first end to a first group of strands in the phase winding coil; a second conductor member which is affixed at a first end to a second group of strands in the phase winding coil and structure for electrically connecting a second opposite end of the first conductor member and a second opposite end of the second conductor member to the conductive ring member, whereby a phase connection is achieved which is less labor-intensive to install and more durable than connectors heretofore known.

A method according to a third aspect of the invention for preparing a half-coil of a stator phase winding of the type which includes at least first and second groups of conductive strands for connection to a solid connector includes the steps of positioning a conductive clip adjacent to each of the respective strand groups; and brazing the clips to the respective strand groups, whereby the clips are electrically connected to the respective strand groups in connections that are resistant to high temperatures, durable and free of voids which could cause power losses.

BRIEF DESCRIPTION OF THE DRAWINGS

FIG. 3 is a fragmentary perspective view of a solid series connector according to a first embodiment of the invention;

FIG. 4 is a front plan view of a phase connector constructed according to a second embodiment of the invention;

FIG. 5 is a fragmentary side elevational view of a pair of phase connectors according to the embodiment first shown in FIG. 4;

FIG. 6 is a fragmentary cross-sectional view through the pair of phase connectors that are depicted in FIG. 4;

DETAILED DESCRIPTION OF THE PREFERRED EMBODIMENT(S)

Figure 1:
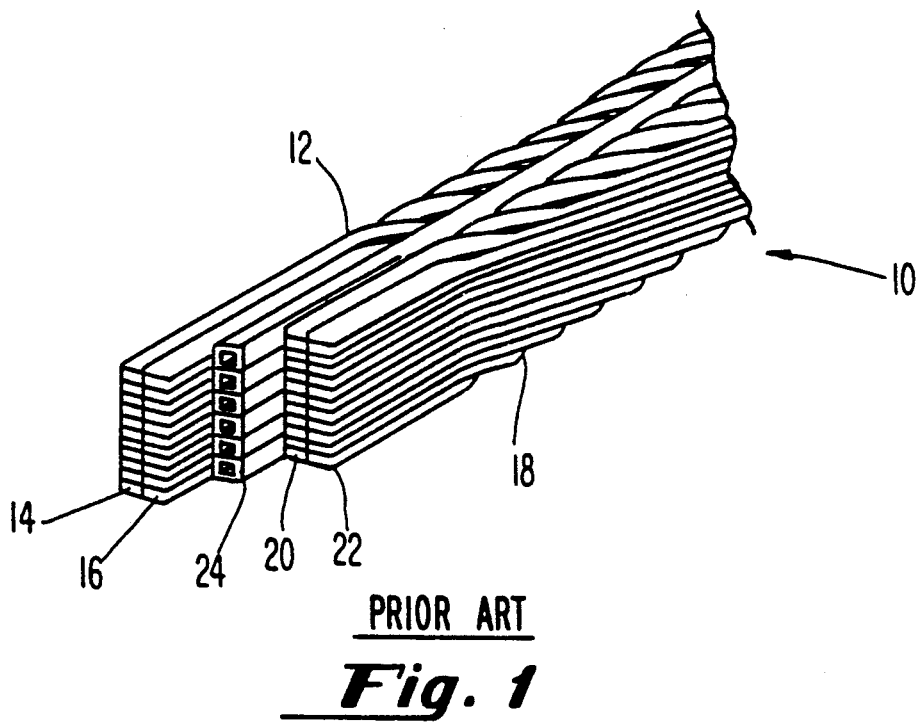
FIG. 1 is a fragmentary perspective view of a half-coil for a stator phase winding according to a prior art design.
Figure 2:
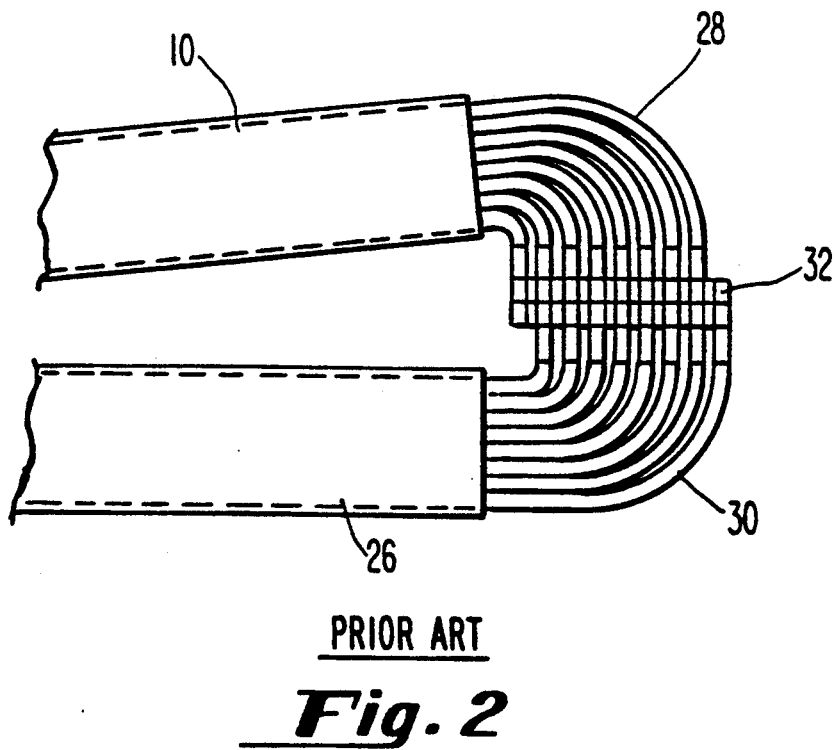
FIG. 2 is a diagrammatical depiction of a group series connection according to a prior art design.

Referring now to the drawings, wherein like reference numerals designate corresponding structure throughout the views, and referring in particular to FIG. 3, a solid series connector 34 constructed according to a first preferred embodiment of the invention is provided within a stator phase winding 36 for connecting the conductive strands of a first half-coil 38 to those of a second half-coil 40. Connector 34 thus joins the half-coil segments 38, 40 together at the ends of the stator to form a continuous phase winding 36.

Referring again to FIG. 3, it will be seen that the first half-coil 38 includes a first group of strands 42 and a second group of strands 44, each of which, in the preferred embodiment, correspond to a pair of strand stacks that are braided together to form a roebel bar within the half-coil 38. For example, it will be seen that first strand group 42 includes a first strand stack 50 and second strand stack 52. Second half-coil 40 includes a third group of strands 46, and a fourth group of strands 48. Each of the respective strand groups 42, 44, 46, 48 is consolidated in its end region into a continuous electrically conductive connector end to minimize electrical losses during current flow from the respective strand group to a conductor member of the connector 34. Preferably, those consolidated end regions, which will be described in greater detail below with reference to their manufacture, each incorporate a conductive clip 54, which is brazed to the individual strands within each strand group 42, 44, 46, 48.

Solid series connector 34 further includes a first conductor member 56 and a second conductor member 58. As is illustrated in FIG. 3, first connector member 56 is affixed at a first end to the first group 42 of strands in the first half-coil 38 and is affixed at a second, opposite end to the third group of strands 46 of the second half-coil 40. Second conductor member 58 is affixed at a first end to the second group 44 of strands in the first half-coil 38 and is affixed at a second, opposite end to the fourth group 48 of strands in the second half-coil 40. In the preferred embodiment, those connections are achieved by brazing the respective end of the respective conductor member 56, 58 to the conductive clip 54 on the respective strand group 42, 44, 46, 48. The brazed connections are more durable than the soldered connections in the group transposed connections, and will withstand higher temperature stresses as well.

Figure 11:
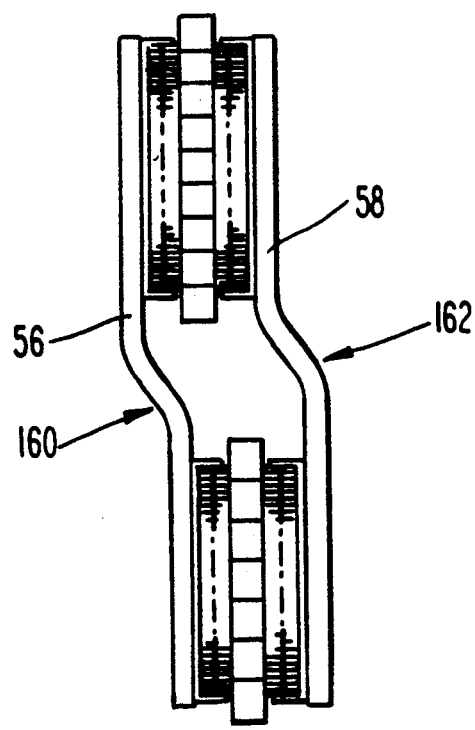
FIG. 11 is a diagrammatical depiction of a fifth method step in the method according to the invention which is depicted in FIGS. 7-10.

In the preferred embodiment, first conductor member 56 extends so as to be substantially parallel to the second conductor member 58. To compensate for possible misalignment between the respective half-coils 38, 40, a first and second conductor members 56, 58 may be crimped, as is illustrated in FIG. 11. It will be appreciated that this capability of the connector 34 will reduce labor costs associated with the installation of a stator phase winding 36. First and second conductor members 56, 58 are preferably elongate, and have a substantially rectangular cross-section. Preferably, the first and second conductor members 56, 58 are fabricated from a material comprising copper, although an equivalent electrically conducted material could be used within the scope of the invention.

A second embodiment of the invention is illustrated in FIGS. 4-6. This embodiment of the invention relates to a phase connector, which is utilized to electrically connect the strands within a phase winding 36 to a power bus, which in the preferred embodiment is a conductive ring member 96. A phase winding 36, then, will likely include a plurality of half-coils, connected to each other by the solid series connectors 34, and to the conductive ring member 96 and the half-coils ends which also represent the ends of the phase winding 36, by one of a first phase connector 60 or a second phase connector 98. First phase connector 60 is configured to connect to a half-coil 62 of a first phase winding coil 64, as is best shown in FIG. 5. First phase connector 60 includes a first conductor member 66, which is affixed at a first end 68 by brazing to a conductive clip 70, which in turn is brazed to the end of a first group of strands 72 from the half-coil 62 of the first phase winding coil 64. First phase connector 60 similarly includes a second conductor member 74 which is parallel to and spaced from the first conductor member 66 and is electrically affixed at a first end 76 by brazing to a conductive clip 78, which is electrically connected by brazing to a second group of strands 80 of the half-coil 62. The first and second conductor members 66, 74 of first phase connector 60 are connected at second ends thereof 84, 86, respectively, to a second connector element 94 of a conductive bracket 88, as may best be seen in FIGS. 4 and 6. Conductive bracket 88 also includes a first connector element 92, which is affixed to second connector element 94 at a first end, and includes a sleeve portion which is brazed to a conductive ring member 96 at a second end thereof. The first and second conductor members 66, 74 may also be crimped to compensate for misalignment of the phase winding coil 64, in the manner depicted in FIG. 11 with respect to the solid series connector 34. Preferably, first and second conductor members 66, 74 are elongate, have a substantially rectangular cross-section, and are fabricated from an electrically conductive material such as copper, which can be brazed. The conductive clips 70, 78 at the ends of the respective strand groups 72, 80, are identical to the conductive clips 54 in the solid series connector 34, and are preferably attached by the same method, which is detailed in appropriate detail below. Conductive bracket 88 further has a vent hole 90 defined therein to allow passage of a coolant such as hydrogen gas into the phase winding coil 64.

The second phase connector 98 is identical in construction to the first phase connector 60, except for the configuration of the first and second conductor members 108, 110, and of the first and second connector elements 104, 106, which are configured to facilitate connection to a half-coil 100 of a second phase winding coil 102, which is positioned beneath the half-coil 62 of first phase winding coil 64. Second phase connector 98 is further configured to extend about a support ring 82 of the stator assembly, and is positioned to connect to a different conductive ring member 96 than the first phase connector 60 connects to. The brazed sleeve connection 97 is part of the second connector element 106 of the second phase connector 98. The sleeve connection used in the first phase connector 60 is substantially identical to sleeve 97, except that it is part of the first connector element 92 of conductive bracket 88.

Figure 7:
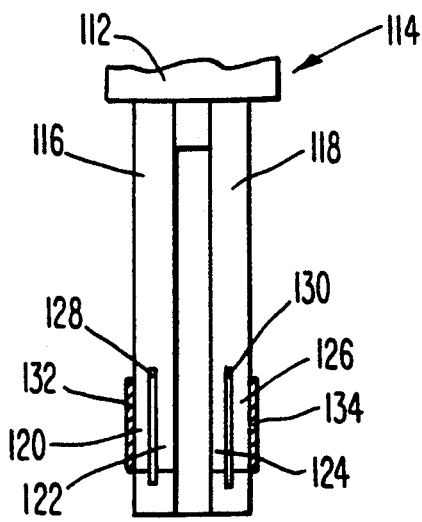
FIG. 7 is a diagrammatical depiction of a first step in a method according to the invention.

The method by which a solid series connector 34 of a phase connector 60, 98 is preferably constructed will now be described in detail with reference to FIGS. 7-11. FIG. 7 depicts the end of a half-coil 112, which is intended to be part of a stator phase winding 114. Half-coil 112 includes a first strand group 116, and a second strand group 118, which in the preferred embodiment, include the strands which constitute two separate roebel bars within the half-coil 112. First strand group 116 includes a first strand stack 120 and a second strand stack 122. Similarly, second strand group 118 includes a first strand stack 124 and a second strand stack 126. To consolidate the strands within the respective stacks 120, 122, 124, 126 for connection to a conductor member and a connector according to the invention, a first copper shim 128 is positioned between the strand stacks 120, 122, and a second copper shim 130 is positioned between strand stacks 126 and 124. The copper shims 128, 130 function to maintain alignment between the strands in the respective stacks 120, 122, 124, 126. Subsequently, strips 132, 134 of a braze alloy are prepositioned approximate the end region of the strand groups 116, 118. Preferably, strip 132, 134 are of a silver-phosphorous-copper alloy commonly known as SIL-FOS. Most preferably, the alloy used contains 15% silver, 80% copper and 5% phosphorous.

Figure 8:
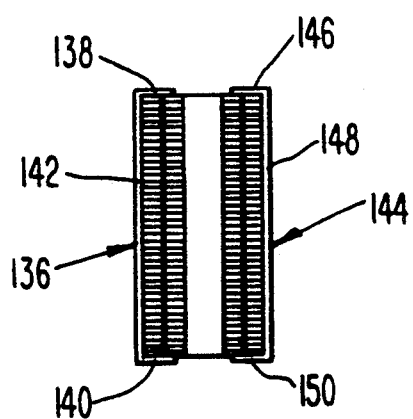
FIG. 8 is a diagrammatical depiction of a second step in the method shown in FIG. 7.

Referring now to FIG. 8, first and second preformed conductive clips 136, 144 are positioned about the respective strand end regions of the strand groups 116, 118, so that the preplaced strips of brazing alloy are between the clips 136, 144 and the strand group ends 116, 118. Referring to FIG. 8, it will be seen that first conductive clip 136 includes a top surface 138, a bottom surface 140,. and a side surface 142. Similarly, second conductor clip 144 includes a top surface 146, a side surface 148 and a bottom surface 150.

Figure 9:
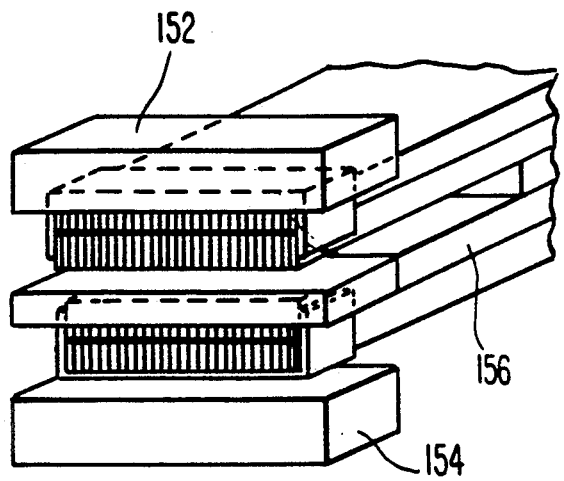
FIG. 9 is a diagrammatical depiction of a third step and the method depicted in FIGS. 7 and 8.

Referring now to FIG. 9, a carbon insert 156 is positioned between the respective end regions of the strand groups 116, 118, and end region assembly is passed through a heating zone formed by a first inductive heater 152 and a second inductive heater 154. The resultant heating brazes the conductive clips 136, 144 to the end regions of the respective strand groups 116, 118.

Figure 10:
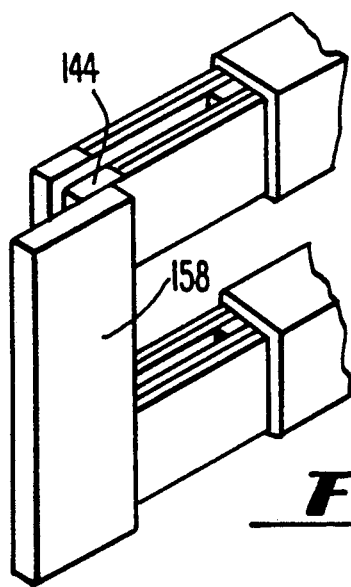
FIG. 10 is a diagrammatical depiction of a fourth method step in the method depicted in FIGS. 7-9.

Referring to FIG. 10, a conductor member 158 is then brazed to the conductive clip 144 by preplacing a strip of brazed alloy between the conductive clip 144 and the conductor member 158, and then passing the assembly through a second inductive heating zone which is similar to that depicted in FIG. 9. This process is used to assemble the connector, whether the connector be a solid series connector 34 by the type illustrated in FIG. 3, or a phase connector 60, 98 of one of the two types that are depicted in FIGS. 4-6.

As shown in FIG. 11, the completed connector may then be modified to compensate for misalignment of the phase winding coil to which it is intended to be connected, by creating crimps 160, 162 in the respective conductor members 56, 58. This is preferably done by preheating the conductor members 56, 58 prior to heating, and then applying mechanical pressure to the conductor member 56, 58 to complete the crimping process.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A half-coil connection for an electrodynamic system such as an electrical generator, comprising:
   a first half-coil comprising a first group of strands comprising more than one strand stack and a second group of strands comprising more than one strand stack;
   a second half-coil comprising a third group of strands comprising more than one strand stack and a fourth group of strands comprising more than one strand stack;
   four strand group clips secured, respectively, to said first, second, third and fourth groups of strands to bind said stacks within said strands together, said clips being electrically conductive;
   a first conductor member affixed at a first end to said strand group clip on said first group of strands and affixed at a second, opposite end to said strand group clip on said second group of strands; and
   a second conductor member affixed at a first end to said strand group clip on said second group of strands and affixed at a second, opposite end to said strand group clip on said fourth group of strands, whereby a solid connection between the half-coils is achieved which is less labor-intensive to install and is more durable than connections heretofore known.

2. A connection according to claim 1, wherein said first conductor member extends so as to be substantially parallel to said second conductor member.

3. A connection according to claim 2, wherein said first and second conductor members are crimped to compensate for misalignment between the first and second half-coils.

4. A connection according to claim 1, wherein said first and second conductor members are elongate and have a substantially rectangular cross-section.

5. A connection according to claim 1, wherein said first and second conductor members are fabricated from a material comprising copper.

6. A connection according to claim 1, wherein said conductor members are brazed to said strand end clips.

7. A connection for electrically connecting a phase winding coil in an electrodynamic system such as a multiphase electrical generator to a conductive ring member in such a system, comprising:
 a conductive ring member;
 a half-coil comprising a first group of strands comprising more than one strand stack and a second group of strands comprising more than one strand stack;
 two strand group clips secured, respectively, to said first and second groups of strands to bind said stacks within said strands together, said clips being electrically conductive;
 a first conductor member affixed at a first end to said strand group clip of said first group of strands;
 a second conductor member affixed at a first end to said strand group clip of said second group of strands; and
 means for electrically connecting a second, opposite end of said first conductor member and a second, opposite end of said second conductor member to said conductive ring member, whereby a phase connection is achieved which is less labor-intensive to install and more durable than connectors heretofore known.

8. A solid phase connection according to claim 7, wherein said first conductor member extends so as to be substantially parallel to said second conductors member.

9. A solid phase connection according to claim 7, wherein said first and second conductor members are elongate and have a substantially rectangular cross-section.

10. A solid phase connection according to claim 7, wherein said first and second conductor members are fabricated from a material comprising copper.

11. A solid phase connection according to claim 7, wherein said clips are brazed to the respective strand ends.

* * * * *